(12) United States Patent
Snagg (10) Patent No.: US 11,013,050 B2
(45) Date of Patent: May 18, 2021

(54) WIRELESS COMMUNICATION HEADSET SYSTEM

(71) Applicant: Ronald Snagg, Rosedale, NY (US)

(72) Inventor: Ronald Snagg, Rosedale, NY (US)

( * ) Notice: Subject to any disclaimer, the term of this patent is extended or adjusted under 35 U.S.C. 154(b) by 0 days.

(21) Appl. No.: 16/813,980

(22) Filed: Mar. 10, 2020

(65) Prior Publication Data

US 2021/0100048 A1     Apr. 1, 2021

Related U.S. Application Data

(60) Provisional application No. 62/909,180, filed on Oct. 1, 2019, provisional application No. 62/951,466, filed on Dec. 20, 2019, provisional application No. 62/960,658, filed on Jan. 13, 2020.

(51) Int. Cl.
*H04W 76/15* (2018.01)
*H04W 4/12* (2009.01)
*H04W 4/06* (2009.01)

(52) U.S. Cl.
CPC ............. *H04W 76/15* (2018.02); *H04W 4/06* (2013.01); *H04W 4/12* (2013.01)

(58) Field of Classification Search
CPC .......... H04W 76/14; H04W 4/06; H04W 4/12
USPC ......................................................... 455/517
See application file for complete search history.

(56) References Cited

U.S. PATENT DOCUMENTS

| 3,939,418 A | 2/1976 | Morrison |
| D318,053 S | 7/1991 | Ludeke |
| 6,522,765 B1 | 2/2003 | Towle |
| 7,110,800 B2 | 9/2006 | Nagayasu |
| 7,844,220 B2 | 11/2010 | Wang |
| 2008/0170740 A1 | 7/2008 | Gantz |
| 2010/0271983 A1* | 10/2010 | Bryant .................... H04B 1/385 370/277 |
| 2015/0081067 A1 | 3/2015 | Yeh |
| 2017/0078915 A1* | 3/2017 | Sun ........................ H04W 28/06 |
| 2019/0208470 A1* | 7/2019 | Asterjadhi .............. H04L 69/22 |

FOREIGN PATENT DOCUMENTS

EP          1722540 A2      11/2006

* cited by examiner

*Primary Examiner* — Lee Nguyen (74) *Attorney, Agent, or Firm* — Kyle A. Fletcher, Esq.

(57) ABSTRACT

The wireless communication headset system is a private communication system. The wireless communication headset system comprises a wireless routing device, a plurality of communication stations, and a plurality of wireless communication links. The wireless communication headset system supports audio and text-based communication between the plurality of communication stations. The wireless communication headset system supports a broadcast model of communication. The wireless routing device establishes a wireless communication link selected from the plurality of wireless communication link with each individual communication station contained in the plurality of communication stations. The wireless routing device is a repeater that receives a message from any first individual communication selected from the plurality of communication stations and retransmits the message to each individual headset remaining in the plurality of headsets.

17 Claims, 5 Drawing Sheets

WIRELESS COMMUNICATION HEADSET SYSTEM

CROSS REFERENCES TO RELATED APPLICATIONS

This application claims priority to provisional application No. 62/909,180 that was filed by the applicant, Ronald Snagg, on Oct. 1, 2019. This application simultaneously claims priority to provisional application 62/951,466 that was filed on Dec. 20, 2019. This application simultaneously claims priority to provisional application 62/960,658 that was filed on Jan. 13, 2020.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of electricity and electric communication technique including wireless communication networks, more specifically, a direct mode connection management device. (H04W76/14)

SUMMARY OF INVENTION

The wireless communication headset system is a private communication system. The wireless communication headset system comprises a wireless routing device, a plurality of communication stations, and a plurality of wireless communication links. The wireless communication headset system supports audio and text-based communication between the plurality of communication stations. The wireless communication headset system supports a broadcast model of communication. By broadcast is meant that: a) any first individual communication station selected from the plurality of communication stations receives any audio and text-based message transmitted by any second individual communication station selected from the plurality of communication stations; and, b) any audio and text-based message transmitted by any first individual communication station selected from the plurality of communication stations is received by all the unselected individual communication stations remaining in the plurality of communication stations. The wireless routing device establishes a wireless communication link selected from the plurality of wireless communication link with each individual communication station contained in the plurality of communication stations. The wireless routing device is a repeater that receives an audio or text-based message from any first individual communication station selected from the plurality of communication stations and retransmits the received message to each individual communication station remaining in the plurality of communication stations.

These together with additional objects, features and advantages of the wireless communication headset system will be readily apparent to those of ordinary skill in the art upon reading the following detailed description of the presently preferred, but nonetheless illustrative, embodiments when taken in conjunction with the accompanying drawings.

In this respect, before explaining the current embodiments of the wireless communication headset system in detail, it is to be understood that the wireless communication headset system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the wireless communication headset system.

It is therefore important that the claims be regarded as including such equivalent construction insofar as they do not depart from the spirit and scope of the wireless communication headset system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
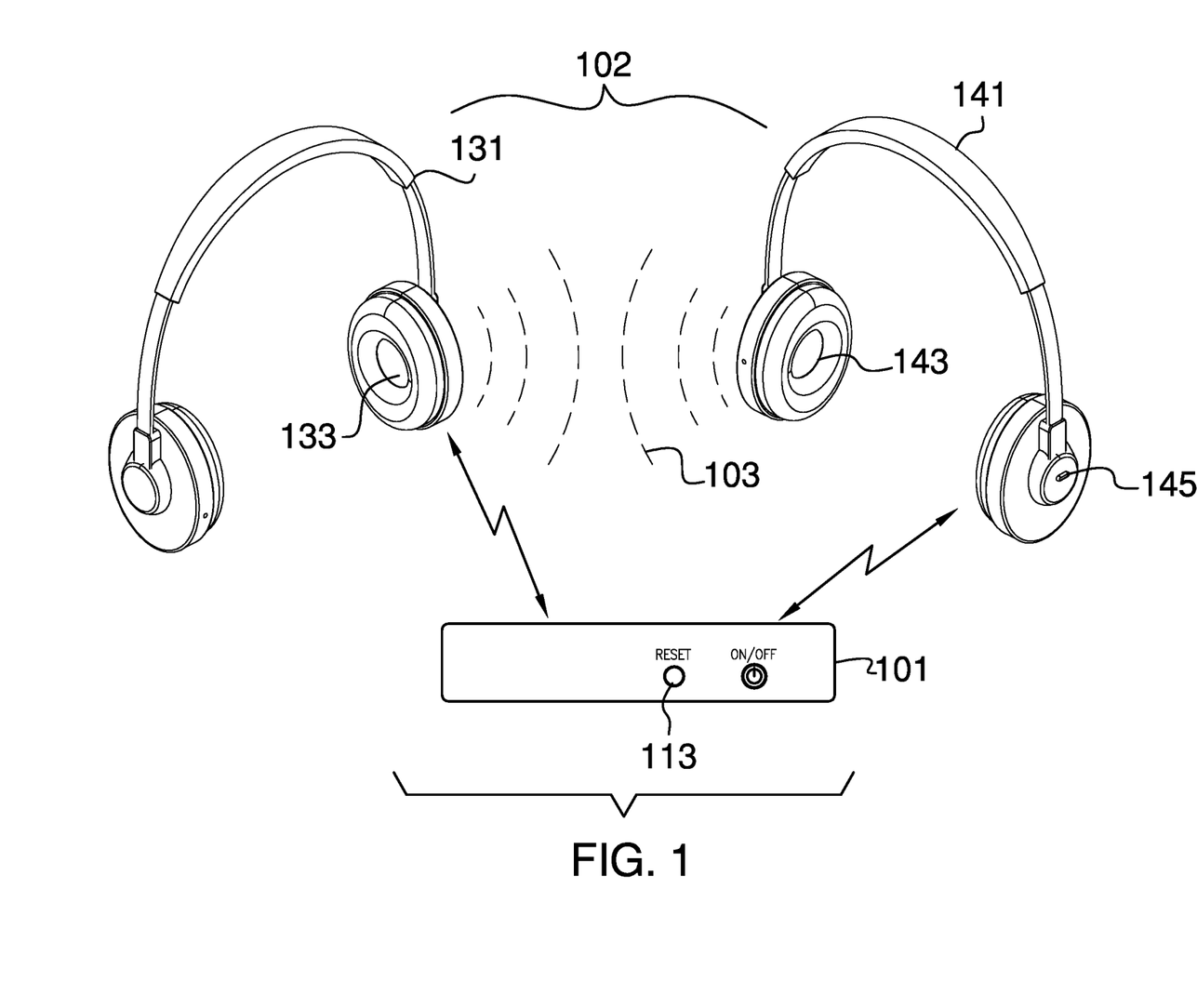
FIG. 1 is a perspective view of an embodiment of the disclosure.
Figure 2:
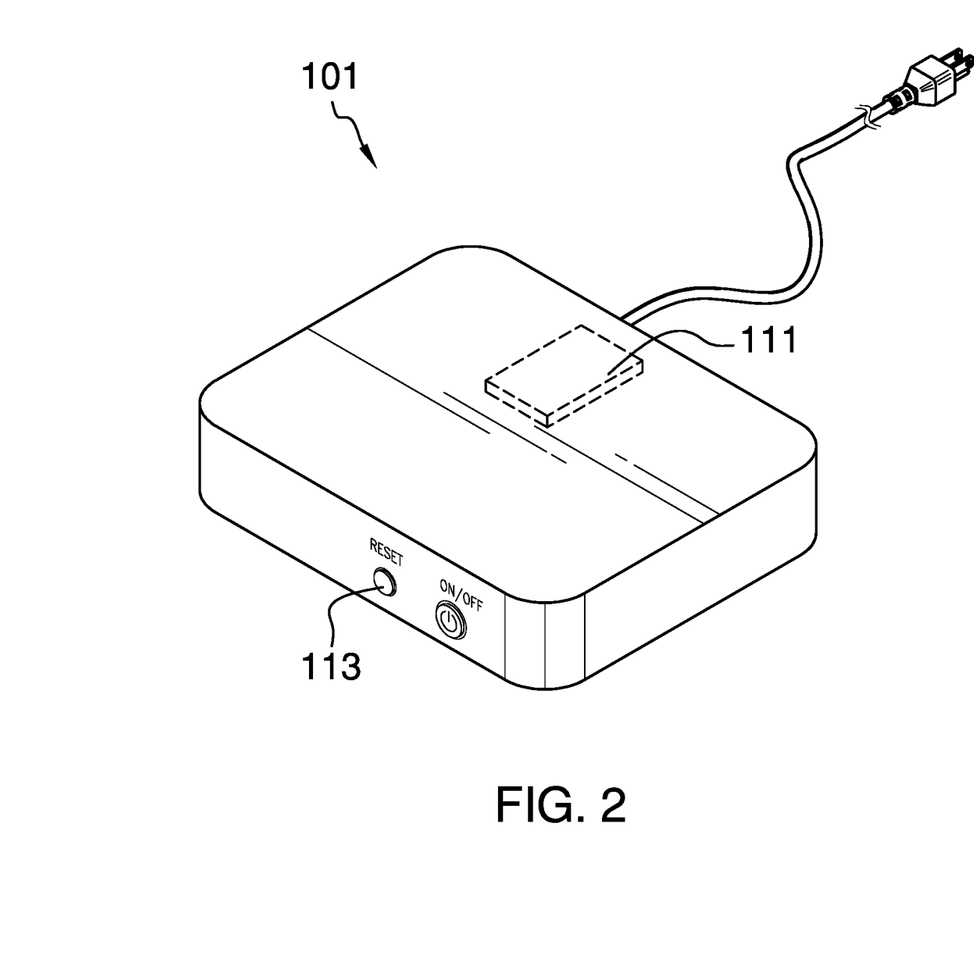
FIG. 2 is a perspective view of an embodiment of the disclosure.
Figure 3:
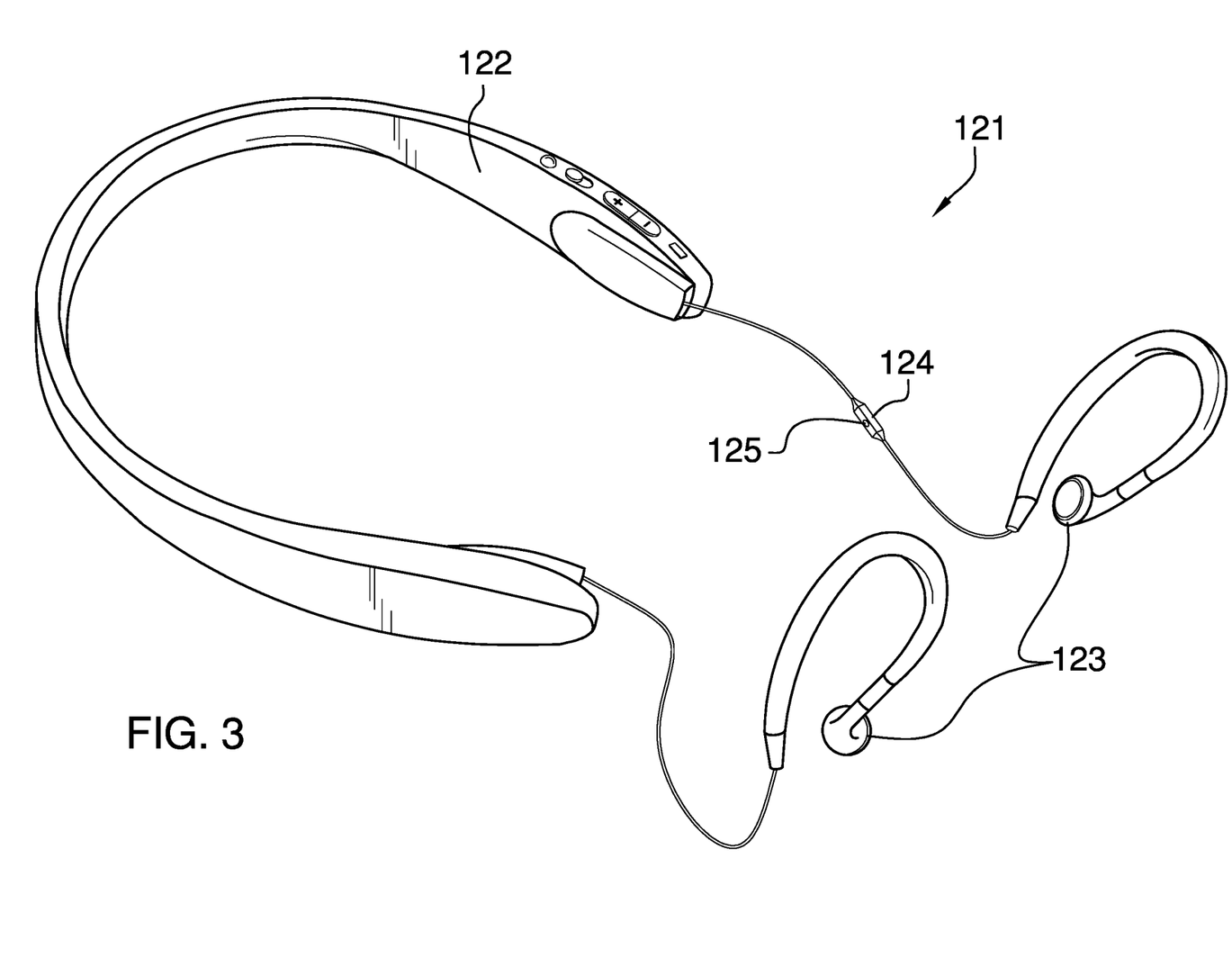
FIG. 3 is a perspective view of an embodiment of the disclosure.
Figure 4:
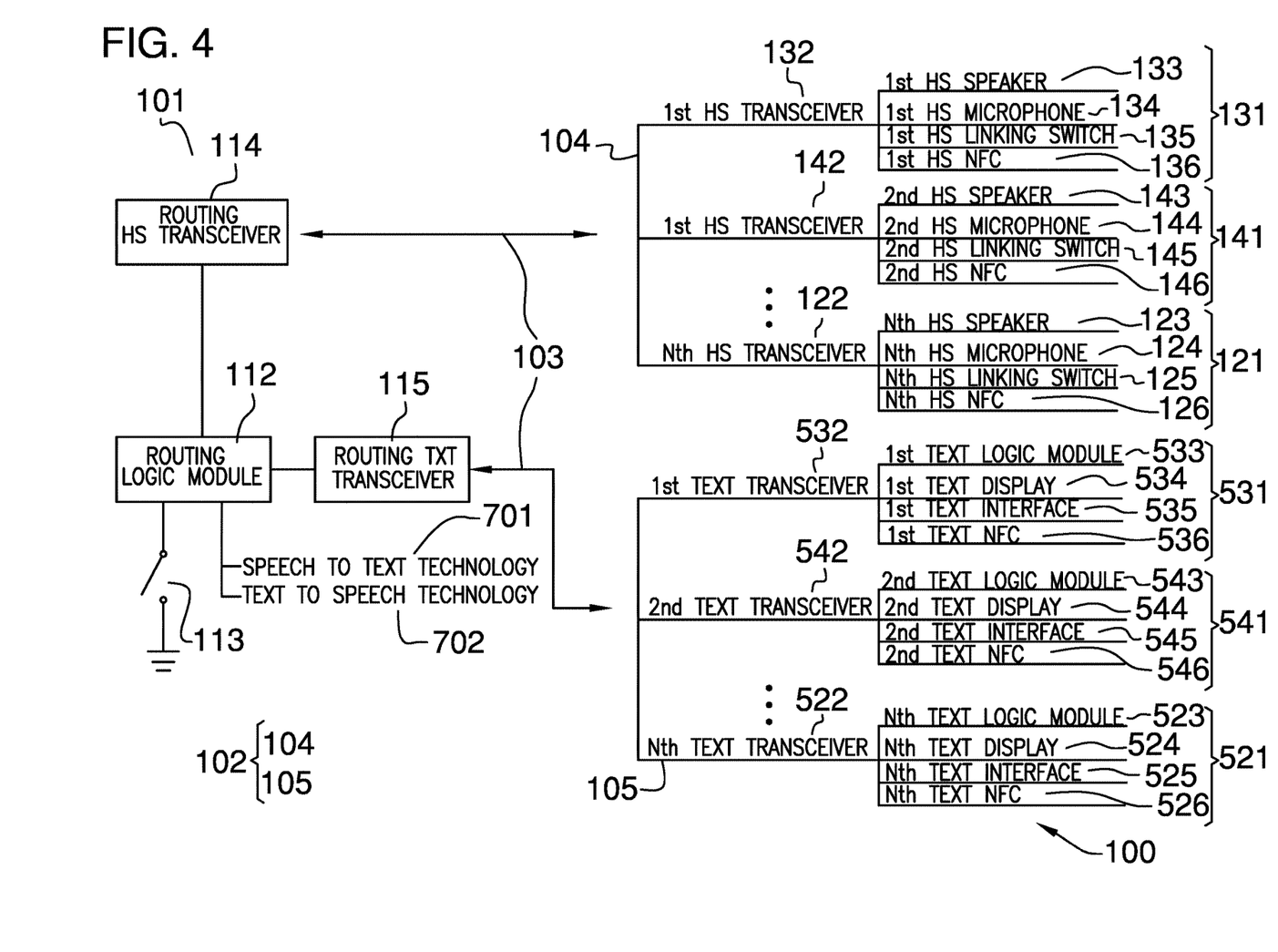
FIG. 4 is a schematic diagram of an embodiment of the disclosure.
Figure 5:
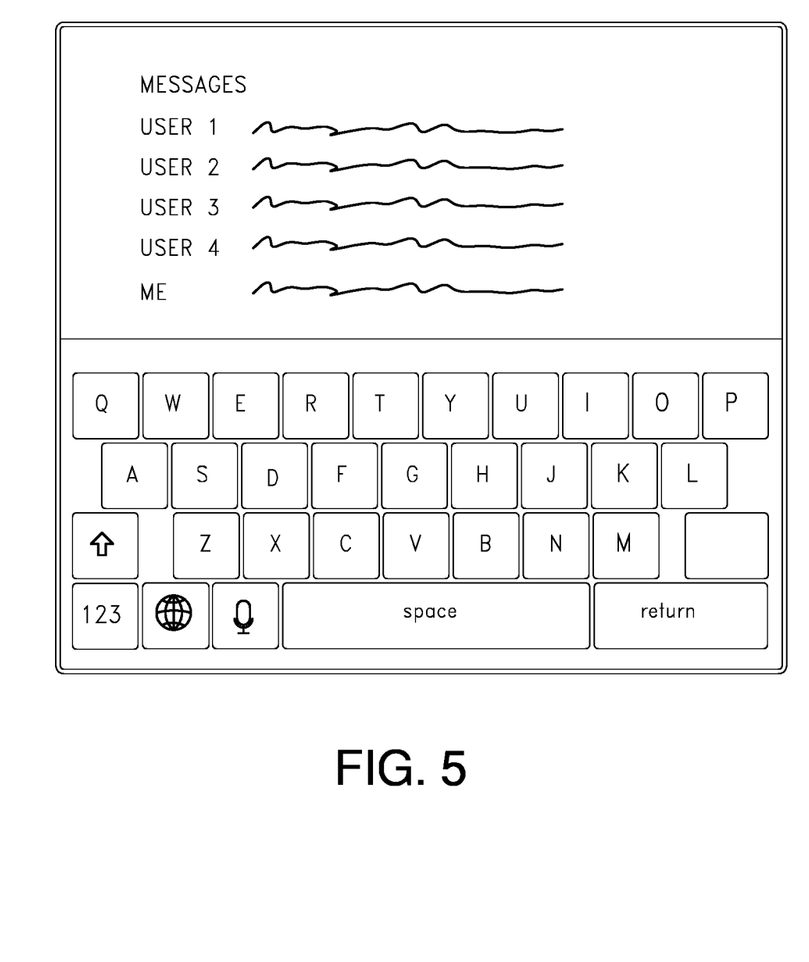
FIG. 5 is a view of an embodiment of the disclosure.

Detailed reference will now be made to one or more potential embodiments of the disclosure, which are illustrated in FIGS. 1 through 5.

The wireless communication headset system 100 (hereinafter invention) is a private communication system. The invention 100 comprises a wireless routing device 101, a plurality of communication stations 102, and a plurality of wireless communication links 103. The plurality of wireless communication links 103 establishes communication links between the wireless routing device 101 and each of the plurality of communication stations 102.

The invention 100 supports audio and text-based communication between the plurality of communication stations 102. The invention 100 supports a broadcast model of communication. By broadcast is meant that: a) any first individual communication station selected from the plurality of communication stations 102 receives any audio or text-based message transmitted by any second individual communication station selected from the plurality of communication stations 102; and, b) any audio or text-based message transmitted by any first individual communication station selected from the plurality of communication stations is received by all the unselected individual communication station remaining in the plurality of communication stations 102.

The invention 100 further supports private communication facility between a subset of communication stations selected from the plurality of communication stations 102. By private communication facility is meant that communications between the communication stations contained in the subset of communication stations selected from the plurality of communication stations 102 are broadcast on a separate communication channel such that communications between the subset of communication stations not accessible from any communication station not contained within the subset of communication stations.

The wireless routing device 101 establishes a wireless communication link selected from the plurality of wireless communication links 103 with each individual communication station contained in the plurality of communication stations 102. The wireless routing device 101 is a repeater that receives an audio or text-based message from any first individual communication station selected from the plurality of communication stations 102 and retransmits the audio or text-based message to each unselected individual communication station remaining in the plurality of communication stations 102.

Each of the plurality of wireless communication links 103 is a structured data exchange mechanism that is established between the wireless routing device 101 and an individual headset 121 selected from the plurality of headsets 104. Each of the plurality of wireless communication links 103 uses a wireless IEEE 802.11x communication protocol such that a physical electric connection between any individual headset 121 selected from the plurality of communication stations 102 and the wireless routing device 101 is not required.

The wireless routing device 101 is an electrical device. The wireless routing device 101 acts as a repeater. The wireless routing device 101 establishes a wireless communication link selected from the plurality of wireless communication links with each individual communication station selected from the plurality of communication stations 102. The wireless routing device 101 receives an audio message from any first individual communication station selected from the plurality of communication stations 102 and retransmits the audio message to each unselected individual communication station remaining in the plurality of communication stations 102. The wireless routing device 101 terminates the plurality of wireless communication links 103. Each wireless communication link established by the wireless routing device 101 uses an IEEE 802.11x communication protocol. The wireless routing device 101 is a commercially available electric device commonly sold as a "WiFi™ router". The design and use of the wireless routing device 101 described above are well-known and documented in the electrical arts.

The wireless routing device 101 comprises a plurality of routing transceivers 111, a logical device 112, and a reset switch 113. The plurality of routing transceivers 111, the logical device 112, and the reset switch 113 are electrically interconnected.

Each of the plurality of routing transceivers 111 is an electrical device. The transceiver is defined elsewhere in this disclosure. Each of the plurality of routing transceivers 111 creates and maintains the plurality of wireless communication links 103 between the wireless routing device 101 and the plurality of communication stations 102. Each of the plurality of routing transceivers 111 is a multichannel device. By multichannel device is meant that each of the plurality of routing transceivers 111 simultaneously manages and maintains each of the multiple wireless communication links selected from the plurality of wireless communication links 103 formed between the plurality of communication stations 102 and the wireless routing device 101.

The plurality of routing transceivers 111 comprises a headset routing transceiver 114 and a text station routing transceiver 115. The plurality of routing transceivers 111 may operate in a fully wireless or wired capability.

The headset routing transceiver 114 is an electrical device. The transceiver is defined elsewhere in this disclosure. The headset routing transceiver 114 creates and maintains the plurality of wireless communication links 103 between the wireless routing device 101 and the plurality of headsets 104. The headset routing transceiver 114 is a multichannel device. By multichannel device is meant that the headset routing transceiver 114 simultaneously manages and maintains each of the multiple wireless communication links selected from the plurality of wireless communication links 103 formed between the plurality of communication stations 102 and the wireless routing device 101.

The text station routing transceiver 115 is an electrical device. The transceiver is defined elsewhere in this disclosure. The text station routing transceiver 115 creates and maintains the plurality of wireless communication links 103 between the wireless routing device 101 and the plurality of text stations 105. The text station routing transceiver 115 is a multichannel device. By multichannel device is meant that the text station routing transceiver 115 simultaneously manages and maintains each of the multiple wireless communication links selected from the plurality of wireless communication links 103 formed between the plurality of communication stations 102 and the wireless routing device 101.

The logical device 112 is an electric circuit. The logical device 112 manages, regulates, and operates the wireless routing device 101. The logical device 112 controls the operation of the plurality of routing transceivers 111. The logical device 112 monitors the reset switch 113. The logic module 112 operates: a) a speech to text technology 701; and, b) a text to speech technology 702. The speech to text technology 701 and the text to speech technology 702 are known technologies used in speech recognition systems. The logic module 112 processes audio messages received from the plurality of headset 104 through the speech to text technology 701 such that the logic module 112 transmits a text translation of the received audio message to the plurality of text stations 105 through the text station routing transceiver 115. The logic module 112 processes text-based messages received from the plurality of text stations 105 through the text to speech technology 102 such that the logic module 112 transmits an audio transcription of the received text-based message to the plurality of headsets 104 through the headset routing transceiver 114.

The reset switch 113 is a momentary switch. The actuation of the reset switch 113 indicates to the logical device 112 that the plurality of routing transceivers 111 should terminate each individual wireless communication link selected from the plurality of wireless communication links 103 such that the communication network formed by the invention 100 is shut down. The communication network is then reestablished by reestablishing each individual wireless communication link selected from the plurality of wireless communication links 103.

The plurality of communication stations 102 comprises a plurality of headsets 104 and a plurality of text stations 105.

Each of the plurality of headsets 104 is a hands-free communication device selected from the group consisting of earbuds and headphones. The term earbuds are defined elsewhere in this disclosure. The term headphones are defined elsewhere in this disclosure. Each of the plurality of headsets 104 forms a wireless communication link selected from the plurality of wireless communication links 103 with the wireless routing device 101. Each wireless communication link uses an IEEE 802.11x communication protocol. The plurality of headsets 104 comprises a collection of individual headsets 121.

Each of the plurality of headsets 104 is a hands-free communication device selected from the group consisting of earbuds and headphones. The term earbuds are defined elsewhere in this disclosure. The term headphones are defined elsewhere in this disclosure. Each of the plurality of headsets 104 forms a wireless communication link selected from the plurality of wireless communication links 103 with the wireless routing device 101. Each wireless communication link uses an IEEE 802.11x communication protocol. Each of the plurality of headsets 104 generates the audio message transmitted over the wireless communication link. Each of the plurality of headsets 104 announces any audio messages received over the wireless communication link.

Any first individual headset 121 selected from the plurality of headsets 104 transmits an audio message over the wireless communication link to the wireless routing device 101. Any first individual headset 121 selected from the plurality of headsets 104 receives any audio messages transmitted over the wireless communication link by the wireless routing device 101 that were transmitted by any second individual headset 121 selected from the plurality of headsets 104.

The plurality of headsets 104 comprises a collection of individual headsets 121.

The individual headset 121 is a wireless communication device. The individual headset 121 is selected from the group consisting of headphones and earbuds. The individual headset 121 establishes a wireless communication link selected from the plurality of wireless communication links 103 with the wireless routing device 101. The individual headset 121 generates and transmits an audio message to the wireless routing device 101 over the wireless communication link. The individual headset 121 receives an audio message that is transmitted from the wireless routing device 101 over the wireless communication link. Each individual headset 121 further comprises an individual headset 121 transceiver 122, an individual headset 121 speaker 123, an individual headset 121 microphone 124, an individual headset 121 linking switch 125, and an individual headset 121 near field communication circuit 126. The individual headset 121 transceiver 122, the individual headset 121 speaker 123, the individual headset 121 microphone 124, the individual headset 121 linking switch 125, and the individual headset 121 near field communication circuit 126 are electrically interconnected.

The individual headset 121 transceiver 122 is an electrical device. The transceiver is defined elsewhere in this disclosure. The individual headset 121 transceiver 122 creates and maintains the wireless communication link selected from the plurality of wireless communication links 103 between the wireless routing device 101 and the individual headset 121 transceiver 122.

The individual headset 121 speaker 123 is a transducer. The individual headset 121 speaker 123 receives electrical signals from the individual headset 121 transceiver 122. The individual headset 121 speaker 123 converts the received electrical signals into acoustic energy that is used to announce the received audio message.

The individual headset 121 microphone 124 is a transducer. The individual headset 121 microphone 124 detects acoustic energy in the vicinity of the individual headset 121 and converts the detected acoustic energy into an electric signal. The individual headset 121 microphone 124 transmits the generated electric signal to the individual headset 121 transceiver 122. The individual headset 121 transceiver 122 transmits the received electric signals to the wireless routing device 101 over the wireless communication link as an audio message.

The individual headset 121 transceiver 122 monitors the individual headset 121 linking switch 125. The individual headset 121 linking switch 125 is a momentary switch. The actuation of the individual headset 121 linking switch 125 indicates to the individual headset 121 transceiver 122 that the individual headset 121 should establish a wireless communication link selected from the plurality of wireless communication links 103 with the wireless routing device 101 such that the individual headset 121 joins the communication network formed by the invention 100.

The individual headset 121 near field communication circuit 126 is an implementation of an RFID (Radio Frequency Identification) technology known as Near Field Communication. The terms RFID and Near Field Communication are defined elsewhere in this disclosure. The individual headset 121 near field communication circuit 126 establishes the initial subset of communication stations selected from the plurality of communication stations 102 used to operate the private communication facility.

The actuation of the individual headset 121 linking switch 125 initiates the transmission of an RFID interrogation signal by the individual headset 121 near field communication circuit 126 of the transmitting individual headset 121. If a receiving individual head set 121 is within the effective range of the transmitting head set 121 (typically 10 cm), then the receiving individual head set 121: a) identifies and available communication channel that is separate from the current broadcast channel; b) changes operation to the identified separate communication channel; and, c) transmits to the transmitting individual headset 121 the identified separate communication channel. Upon receipt of the RFID response, transmitting individual headset 121 changes operation to the identified separate communication channel thereby establishing the initial subset of communication stations selected from the plurality of communication stations 102 using the private communication facility.

To add additional communication stations selected from the plurality of communication stations 102, the communication station to be added actuation of the individual headset 121 linking switch 125 thereby initiating the transmission of an RFID interrogation signal by the individual headset 121 near field communication circuit 126 to become the transmitting individual headset 121. If the receiving individual head set 121 is already a member of an existing subset of communication stations selected from the plurality of communication stations 102 using the private communication facility, then the individual headset 121 near field communication circuit 126 of the receiving individual headset 121 transmits to the individual headset 121 near field communication circuit 126 of the transmitting individual headset 121 the communication channel information of the existing subset of communication stations associated with the private communication facility.

The procedure described in the previous three paragraphs work for all communication stations selected from the plurality of communication stations 102 independent of whether the communication station is selected from the plurality of headsets 104 or the plurality of text stations 105.

In the first potential embodiment of the disclosure, the plurality of headsets 104 comprises a first headset 131 and a second headset 141.

The first headset 131 further comprises a first headset 131 transceiver 132, a first headset 131 speaker 133, a first headset 131 microphone 134, and a first headset 131 linking switch 135, and a first headset 131 near field communication circuit 136. The first headset 131 transceiver 132, the first headset 131 speaker 133, the first headset 131 microphone 134, the first headset 131 linking switch 135, and the first headset 131 near field communication circuit 136 are electrically interconnected.

The first headset 131 is a headset used to join the communication network formed by the invention 100. The first headset 131 transceiver 132 is the individual headset 121 transceiver 122 associated with the first headset 131. The first headset 131 speaker 133 is the individual headset 121 speaker 123 associated with the first headset 131. The first headset 131 microphone 134 is the individual headset 121 microphone 124 associated with the first headset 131. The first headset 131 linking switch 135 is the individual headset 121 linking switch 125 associated with the first headset 131. The first headset 131 near field communication circuit 136 is the individual headset 121 near field communication circuit 126 associated with the first headset 131.

The second headset 141 further comprises a second headset 141 transceiver 142, a second headset 141 speaker 143, a second headset 141 microphone 144, and a second headset 141 linking switch 145, and a second headset 141 near field communication circuit 146. The second headset 141 transceiver 142, the second headset 141 speaker 143, the second headset 141 microphone 144, the second headset 141 linking switch 145, and the second headset 141 near field communication circuit 146 are electrically interconnected.

The second headset 141 is a headset used to join the communication network formed by the invention 100. The second headset 141 transceiver 142 is the individual headset 121 transceiver 122 associated with the second headset 141. The second headset 141 speaker 143 is the individual headset 121 speaker 123 associated with the second headset 141. The second headset 141 microphone 144 is the individual headset 121 microphone 124 associated with the second headset 141. The second headset 141 linking switch 145 is the individual headset 121 linking switch 125 associated with the second headset 141. The second headset 141 near field communication circuit 146 is the individual headset 121 near field communication circuit 126 associated with the second headset 141.

Each of the plurality of text stations 105 is a text-based communication device selected from the group consisting of earbuds and headphones. The term earbuds are defined elsewhere in this disclosure. The term headphones are defined elsewhere in this disclosure. Each of the plurality of text stations 105 forms a wireless communication link selected from the plurality of wireless communication links 103 with the wireless routing device 101. Each wireless communication link uses an IEEE 802.11x communication protocol. The plurality of text stations 105 comprises a collection of individual text stations 521.

The individual text station 521 is a wireless communication device. The individual text station 521 establishes a wireless communication link selected from the plurality of wireless communication links 103 with the wireless routing device 101. The individual text station 521 generates and transmits a text-based message to the wireless routing device 101 over the wireless communication link. The individual text station 521 receives the text-based message that is transmitted from the wireless routing device 101 over the wireless communication link. The individual text station 521 transceiver 522 creates and maintains the wireless communication link selected from the plurality of wireless communication links 103 between the text station routing transceiver 115 and each individual text station 521 transceiver 522.

Any first individual text station 521 selected from the plurality of text stations 105 transmits a text-based message over the wireless communication link to the wireless routing device 101. Any first individual text station 521 selected from the plurality of text stations 105 receives any text-based messages transmitted over the wireless communication link by the wireless routing device 101 that were transmitted by any second individual text station 521. Each of the plurality of text stations 105 generates the text-based message transmitted over the wireless communication link. Each of the plurality of text stations 105 displays the text-based messages received over the wireless communication link. Each individual text station 521 further comprises an individual text station 521 transceiver 522, an individual text station 521 logic module 523, an individual text station 521 display 524, and an individual text station 521 interface 525, and an individual text station 521 near field communication circuit 526.

The individual text station 521 transceiver 522, the individual text station 521 logic module 523, the individual text station 521 display 524 the individual text station 521 interface 525, and the individual text station 521 near field communication circuit 526 are electrically interconnected.

The individual text station 521 transceiver 522 is an electrical device. The transceiver is defined elsewhere in this disclosure. The individual text station 521 transceiver 522 creates and maintains the wireless communications link selected from the plurality of wireless communication links 103 between the plurality of text stations 105 and each individual text station 521 transceiver 522.

The individual text station 521 logic module 523 is a programmable electrical device. The individual text station 521 logic module 523 receives a text-based message from the individual text station 521 transceiver 522. The individual text station 521 logic module 523 converts the received electrical signals into a text-based message that is displayed on the individual text station 521 display 524.

The individual text station 521 display 524 is an electrical device used to display the text-based message transmitted from the individual text station 521 logic module 523. The individual text station 521 interface 525 receives a text-based message from the user of the individual text station 521 and transmits the text-based message to the individual text station 521 logic module 523 for transmission to the plurality of text stations 105 by the individual text station 521 transceiver 522.

The individual text station 521 near field communication circuit 526 is an implementation of an RFID (Radio Frequency Identification) technology known as Near Field Communication. The terms RFID and Near Field Communication are defined elsewhere in this disclosure. The individual text station 521 near field communication circuit 526 establishes the initial subset of communication stations selected from the plurality of communication stations 102 used to operate the private communication facility.

The individual text station 521 interface 525 initiates the transmission of an RFID interrogation signal by the individual text station 521 near field communication circuit 526 of the transmitting individual text station 521. If a receiving individual text station 521 is within the effective range of the transmitting text station 521 (typically 10 cm), then the receiving individual text station 521: a) identifies and available communication channel that is separate from the current broadcast channel; b) changes operation to the identified separate communication channel; and, c) transmits to the transmitting individual text station 521 the identified separate communication channel. Upon receipt of the RFID response, transmitting individual text station 521 changes operation to the identified separate communication channel thereby establishing the initial subset of communication stations selected from the plurality of communication stations 102 using the private communication facility.

To add additional communication stations selected from the plurality of communication stations 102, individual text station 521 linking switch 125 of the individual text station 521 to be added thereby initiates the transmission of an RFID interrogation signal by the individual text station 521 near field communication circuit 526 to become the transmitting individual text station 521. If the receiving individual head set 121 is already a member of an existing subset of communication stations selected from the plurality of communication stations 102 using the private communication facility, then the individual text station 521 near field communication circuit 526 of the receiving individual text station 521 transmits to the individual text station 521 near field communication circuit 526 of the transmitting individual text station 521 the communication channel information of the existing subset of communication stations associated with the private communication facility.

The procedure described in the previous three paragraphs work for all communication stations selected from the plurality of communication stations 102 independent of whether the communication station is selected from the plurality of headsets 104 or the plurality of text stations 105.

In the first potential embodiment of the disclosure, the plurality of text stations 105 further comprises a first text station 531 and a second text station 541.

The first text station 531 further comprises a first text station 531 transceiver 532, a first text station 531 logic module 533, a first text station 531 display 534, first text station 531 interface 535, and a first text station 531 near field communication circuit 536. The first text station 531 transceiver 532, the first text station 531 logic module 533, the first text station 531 display 534 the first text station 531 interface 535, and the first text station 531 near field communication circuit 536 are electrically interconnected.

The first text station 531 is a headset used to join the communication network formed by the invention 100. The first text station 531 transceiver 532 is the individual text station 521 transceiver 522 associated with the first text station 531. The first text station 531 logic module 533 is the individual text station 521 logic module 523 associated with the first text station 531. The first text station 531 display 534 is the individual text station 521 display 524 associated with the first text station 531. The first text station 531 interface 535 is the individual text station 521 interface 525 associated with the first text station 531. The first text station 531 near field communication circuit 536 is the individual text station 521 near field communication circuit 526 associated with the first text station 531.

The second text station 541 further comprises a second text station 541 transceiver 542, a second text station 541 logic module 543, a second text station 541 display 544, a second text station 541 interface 545, and a second text station 541 near field communication circuit 546. The second text station 541 transceiver 542, the second text station 541 logic module 543, the second text station 541 display 544 and the second text station 541 interface 545, and the second text station 541 near field communication circuit 546 are electrically interconnected.

The second text station 541 is a headset used to join the communication network formed by the invention 100. The second text station 541 transceiver 542 is the individual text station 521 transceiver 522 associated with the second text station 541. The second text station 541 logic module 543 is the individual text station 521 logic module 523 associated with the second text station 541. The second text station 541 display 544 is the individual text station 521 display 524 associated with the second text station 541. The second text station 541 interface 545 is the individual text station 521 interface 525 associated with the second text station 541. The second text station 541 near field communication circuit 546 is the individual text station 521 near field communication circuit 526 associated with the second text station 541.

The following definitions were used in this disclosure:

Announce: As used in this disclosure, to announce means to generate audible sounds over a transducer.

Audio: As used in this disclosure, audio refers to the reproduction of a sound that simulates the sound that was originally created.

Audio Device: As used in this disclosure, an audio device is a device that generates audible sound waves.

Audio Source: As used in this disclosure, an audio source is a device that generates electrical signals that can be converted into audible sounds by an audio device such as a speaker.

Broadcast: As used in this disclosure, a broadcast refers to a radio frequency transmission intended to be received by a plurality of receivers.

Communication Link: As used in this disclosure, a communication link refers to the structured exchange of data between two objects.

Display: As used in this disclosure, a display is a surface upon which is presented an image, potentially including, but not limited to, graphic images and text, that is interpretable by an individual viewing the projected image in a meaningful manner. A display device refers to an electrical device used to present these images.

Earphone: As used in this disclosure, an earphone refers to a device that converts electrical signals into audible sounds that are worn or listened to in contact with the ear.

IEEE: As used in this disclosure, the IEEE (pronounced "I triple E") is an acronym for the Institute of Electrical and Electronic Engineers.

Hands-Free: As used in this disclosure, hands-free refers to a design characteristic of a device that allows the device to be used or operated without the use of the hands.

Headphone: As used in this disclosure, a headphone is a device that comprises one or two earphones that are held to the ear, typically through the use of a band placed on top of the head. The headphone comprises one or more speakers and an optional microphone to allow for: 1) private access to an audio communication system; and, 2) hands free access to an audio communication system. Headset is a synonym for headphone.

Interface: As used in this disclosure, an interface is a physical or virtual boundary that separates two different systems across which information is exchanged.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Logical Device: As used in this disclosure, a logical device is an electrical device that processes externally provided inputs to generate outputs that are determined from a previously determined logical functions. A logical device may or may not be programmable.

Microphone: As used in this disclosure, a microphone is a transducer that converts the energy from vibration into electrical energy. The sources of vibrations include, but are not limited to, acoustic energy.

Momentary Switch: As used in this disclosure, a momentary switch is a biased switch in the sense that the momentary switch has a baseline position that only changes when the momentary switch is actuated (for example, when a pushbutton switch is pushed or a relay coil is energized). The momentary switch then returns to the baseline position once the actuation is completed. This baseline position is called the "normal" position. For example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

Near Field Communication: As used in this disclosure, near field communication, commonly referred to as NFC, is an RFID technology and communication protocol that is commonly implemented on personal data devices. The operating range of near field technology is generally less than 20 centimeters.

Network: As used in this disclosure, a network refers to a data communication or data exchange structure where data is electronically transferred between nodes, also known as terminals, which are electrically attached to the network. In common usage, the operator of the network is often used as an adjective to describe the network. For example, a telecommunication network would refer to a network run by a telecommunication organization while a banking network will refer to a network operated by an organization involved in banking.

Repeater: As used in this disclosure, a repeater is an electrical device that receives a first signal from a first communication channel and transmits a duplicate second signal over a second communication channel. When a radio frequency wireless communication channel is used as both the first communication channel and the second communication channel the frequencies of operation of the first communication channel and the second communication channels may or may not be identical.

RFID: As used in this disclosure, RFID refers to Radio Frequency Identification technology. RFID is a wireless technology that uses electromagnetic field to identify and retrieve data from tracking tags that are placed on or near an object.

RFID Interrogator: As used in this disclosure, an RFID interrogator is a device that transmits a radio signal at frequency designed to activate RFID tracking tags that are tuned to operate at that frequency.

RFID Tracking Tag: As used in this disclosure, an RFID tracking tag is a reflective antenna that receives a radio signal from an RFID Interrogator and uses the energy received from the RFID interrogator signal to reflect a modified signal back to the RFID interrogator. The modified signal generally contains identification information about the RFID tag. The RFID interrogator receives and records these reflected signals. RFID tags are generally tuned to respond to a specific frequency. The RFID tracking tag as described to this point is a passive, or unpowered RFID tracking tag. There are also available within RFID technology active, or powered, RFID tracking tags. An active RFID tracking tag acts as a beacon that actively transmits identification information in a manner that can be received and recorded by an RFID interrogator. Within this disclosure, both passive and active RFID tracking tags are used.

Speaker: As used in this disclosure, a speaker is an electrical transducer that converts an electrical signal into an audible sound.

Speech Recognition: As used in this disclosure, an speech recognition refers to a collection of commercially available algorithms that capture process a digital representation of an audible sound in a manner that allows an electronically operated device, such as a computer, to extract data from the digital representation of an audible sound and take a subsequent action based on the data extracted from the audible sound.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Transceiver: As used in this disclosure, a transceiver is a device that is used to generate, transmit, and receive electromagnetic radiation such as radio signals.

Transducer: As used in this disclosure, a transducer is a device that converts a physical quantity, such as pressure or brightness into an electrical signal or a device that converts an electrical signal into a physical quantity.

WiFi™: As used in this disclosure, WiFi™ refers to the physical implementation of a collection of wireless electronic communication standards commonly referred to as IEEE 802.11x.

Wireless: As used in this disclosure, wireless is an adjective that is used to describe a communication channel between two devices that does not require the use of physical cabling.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A wireless communication system comprising
a wireless routing device, a plurality of communication stations, and a plurality of wireless communication links;
wherein the plurality of wireless communication links establishes communication links between the wireless routing device and each of the plurality of communication stations;
wherein the wireless communication system supports audio and text-based communication between the plurality of communication stations;
wherein the wireless communication system is a private communication system;
wherein the wireless communication system supports a broadcast model of communication;
wherein by broadcast is meant that: a) any first individual communication station selected from the plurality of communication stations receives any audio or text-based message transmitted by any second individual communication station selected from the plurality of communication stations; and, b) any audio or text-based message transmitted by any first individual communication station selected from the plurality of communication stations is received by all the unselected individual communication station remaining in the plurality of communication stations;
wherein the wireless routing device comprises a plurality of routing transceivers, a logical device, and a reset switch;
wherein the plurality of routing transceivers, the logical device, and the reset switch are electrically interconnected;
wherein the plurality of communication stations comprises a plurality of headsets and a plurality of text stations;
wherein each of the plurality of headsets is a hands-free communication device selected from the group consisting of earbuds and headphones;
wherein each of the plurality of headsets forms a wireless communication link selected from the plurality of wireless communication links with the wireless routing device;
wherein each of the plurality of text stations is a text-based communication device;
wherein each of the plurality of text stations forms a wireless communication link selected from the plurality of wireless communication links with the wireless routing device.

2. The wireless communication system according to claim 1
wherein the wireless communication system supports a private communication facility;
wherein by private communication facility is meant that communications between the communication stations contained in the subset of communication stations selected from the plurality of communication stations are broadcast on a separate communication channel such that communications between the subset of communication stations not accessible from any communication station not contained within the subset of communication stations.

3. The wireless communication system according to claim 2
wherein the wireless routing device establishes a wireless communication link selected from the plurality of wireless communication links with each individual communication station contained in the plurality of communication stations;
wherein the wireless routing device receives a message from any first individual communication station selected from the plurality of communication stations and retransmits the message to each unselected individual communication station remaining in the plurality of communication stations;
wherein the message is selected from the group consisting of an audio message and a text-based message.

4. The wireless communication system according to claim 3 wherein each of the plurality of wireless communication links is a structured data exchange mechanism that is established between the wireless routing device and an individual headset selected from the plurality of headsets.

5. The wireless communication system according to claim 4 wherein the wireless routing device terminates the plurality of wireless communication links.

6. The wireless communication system according to claim 5
wherein each of the plurality of routing transceivers is an electrical device;
wherein each of the plurality of routing transceivers creates and maintains the plurality of wireless communication links between the wireless routing device and the plurality of communication stations;
wherein each of the plurality of routing transceivers is a multichannel device;
wherein by multichannel device is meant that each of the plurality of routing transceivers simultaneously manages and maintains each of the multiple wireless communication links selected from the plurality of wireless communication links formed between the plurality of communication stations and the wireless routing device.

7. The wireless communication system according to claim 6
wherein the plurality of headsets comprises a collection of individual headsets;
wherein each of the plurality of headsets is a hands-free communication device selected from the group consisting of earbuds and headphones;
wherein each of the plurality of headsets forms a wireless communication link selected from the plurality of wireless communication links with the wireless routing device;
wherein each of the plurality of headsets announces any audio messages received over the wireless communication link;
wherein any first individual headset selected from the plurality of headsets transmits an audio message over the wireless communication link to the wireless routing device;

wherein any first individual headset selected from the plurality of headsets receives any audio messages transmitted over the wireless communication link by the wireless routing device that were transmitted by any second individual headset selected from the plurality of headsets.

8. The wireless communication system according to claim 7 wherein the plurality of text stations comprises a collection of individual text stations;
wherein the individual text station is a wireless communication device;
wherein the individual text station establishes a wireless communication link selected from the plurality of wireless communication links with the wireless routing device;
wherein the individual text station generates and transmits a text-based message to the wireless routing device over the wireless communication link;
wherein the individual text station receives the text-based message that is transmitted from the wireless routing device over the wireless communication link;
wherein the individual text station transceiver creates and maintains the wireless communication link selected from the plurality of wireless communication links between the text station routing transceiver and each individual text station transceiver;
wherein any first individual text station selected from the plurality of text stations transmits a text-based message over the wireless communication link to the wireless routing device;
wherein any first individual text station selected from the plurality of text stations receives any text-based messages transmitted over the wireless communication link by the wireless routing device that were transmitted by any second individual text station;
wherein each of the plurality of text stations generates the text-based message transmitted over the wireless communication link;
wherein each of the plurality of text stations displays the text-based messages received over the wireless communication link.

9. The wireless communication system according to claim 8 wherein the plurality of routing transceivers comprises a headset routing transceiver and a text station routing transceiver;
wherein the headset routing transceiver is an electrical device;
wherein the headset routing transceiver creates and maintains the plurality of wireless communication links between the wireless routing device and the plurality of headsets;
wherein the headset routing transceiver is a multichannel device;
wherein by multichannel device is meant that the headset routing transceiver simultaneously manages and maintains each of the multiple wireless communication links selected from the plurality of wireless communication links formed between the plurality of communication stations and the wireless routing device;
wherein the text station routing transceiver is an electrical device;
wherein the text station routing transceiver creates and maintains the plurality of wireless communication links between the wireless routing device and the plurality of text stations;
wherein the text station routing transceiver is a multichannel device;
wherein by multichannel device is meant that the text station routing transceiver simultaneously manages and maintains each of the multiple wireless communication links selected from the plurality of wireless communication links formed between the plurality of communication stations and the wireless routing device.

10. The wireless communication system according to claim 9 wherein the logical device is an electric circuit;
wherein the logical device controls the operation of the plurality of routing transceivers;
wherein the logical device monitors the reset switch.

11. The wireless communication system according to claim 10 wherein the logic module operates: a) a speech to text technology; and, b) a text to speech technology;
wherein the logic module processes audio messages received from the plurality of headset through the speech to text technology such that the logic module transmits a text translation of the received audio message to the plurality of text stations through the text station routing transceiver;
wherein the logic module processes text-based messages received from the plurality of text stations through the text to speech technology such that the logic module transmits an audio transcription of the received text-based message to the plurality of headsets through the headset routing transceiver.

12. The wireless communication system according to claim 11 wherein the reset switch is a momentary switch;
wherein the actuation of the reset switch indicates to the logical device that the plurality of routing transceivers should terminate each individual wireless communication link selected from the plurality of wireless communication links such that the communication network formed by the wireless communication system is shut down;
wherein the communication network is then reestablished by reestablishing each individual wireless communication link selected from the plurality of wireless communication links.

13. The wireless communication system according to claim 12 wherein the individual headset is a wireless communication device;
wherein the individual headset is selected from the group consisting of headphones and earbuds;
wherein the individual headset establishes a wireless communication link selected from the plurality of wireless communication links with the wireless routing device;
wherein the individual headset generates and transmits an audio message to the wireless routing device over the wireless communication link;
wherein the individual headset receives an audio message that is transmitted from the wireless routing device over the wireless communication link.

14. The wireless communication system according to claim 13 wherein each individual headset further comprises an individual headset transceiver, an individual headset speaker, an individual headset microphone, an individual headset linking switch, and an individual headset near field communication circuit;

wherein the individual headset transceiver, the individual headset speaker, the individual headset microphone, the individual headset linking switch, and the near field communication circuit are electrically interconnected;

wherein the individual headset transceiver is an electrical device;

wherein the individual headset transceiver creates and maintains the wireless communication link selected from the plurality of wireless communication links between the wireless routing device and the individual headset transceiver;

wherein the individual headset speaker is a transducer;

wherein the individual headset speaker receives electrical signals from the individual headset transceiver;

wherein the individual headset speaker converts the received electrical signals into acoustic energy that is used to announce the received audio message;

wherein the individual headset microphone is a transducer;

wherein the individual headset microphone detects acoustic energy in the vicinity of the individual headset and converts the detected acoustic energy into an electric signal;

wherein the individual headset microphone transmits the generated electric signal to the individual headset transceiver;

wherein the individual headset transceiver transmits the received electric signals to the wireless routing device over the wireless communication link as an audio message;

wherein the individual headset transceiver monitors the individual headset linking switch;

wherein the individual headset linking switch is a momentary switch;

wherein the actuation of the individual headset linking switch indicates to the individual headset transceiver that the individual headset should establish a wireless communication link selected from the plurality of wireless communication links with the wireless routing device such that the individual headset joins the communication network formed by the wireless communication system;

wherein the individual headset near field communication circuit establishes the private communication facility.

15. The wireless communication system according to claim 14 wherein the plurality of headsets comprises a first headset, a second headset, and an Nth headset;

wherein the first headset further comprises a first headset transceiver, a first headset speaker, a first headset microphone, a first headset linking switch, and a first headset nearfield communication circuit;

wherein the first headset transceiver, the first headset speaker, the first headset microphone, the first headset linking switch, and the first headset nearfield communication circuit are electrically interconnected;

wherein the second headset further comprises a second headset transceiver, a second headset speaker, a second headset microphone, a second headset linking switch, and a second headset nearfield communication circuit;

wherein the second headset transceiver, the second headset speaker, the second headset microphone, the second headset linking switch, and the second headset nearfield communication circuit are electrically interconnected;

wherein the Nth headset further comprises a Nth headset transceiver, a Nth headset speaker, a Nth headset microphone, a Nth headset linking switch, and a Nth headset nearfield communication circuit;

wherein the Nth headset transceiver, the Nth headset speaker, the Nth headset microphone, the Nth headset linking switch, and the Nth headset nearfield communication circuit are electrically interconnected;

wherein the first headset transceiver is the individual headset transceiver associated with the first headset;

wherein the first headset speaker is the individual headset speaker associated with the first headset;

wherein the first headset microphone is the individual headset microphone associated with the first headset;

wherein the first headset linking switch is the individual headset linking switch associated with the first headset;

wherein the first headset near field communication circuit is the individual headset near field communication circuit associated with the first headset;

wherein the second headset transceiver is the individual headset transceiver associated with the second headset;

wherein the second headset speaker is the individual headset speaker associated with the second headset;

wherein the second headset microphone is the individual headset microphone associated with the second headset;

wherein the second headset linking switch is the individual headset linking switch associated with the second headset;

wherein the second headset near field communication circuit is the individual headset near field communication circuit associated with the second headset;

wherein the Nth headset transceiver is the individual headset transceiver associated with the Nth headset;

wherein the Nth headset speaker is the individual headset speaker associated with the Nth headset;

wherein the Nth headset microphone is the individual headset microphone associated with the Nth headset;

wherein the Nth headset linking switch is the individual headset linking switch associated with the Nth headset;

wherein the Nth headset near field communication circuit is the individual headset near field communication circuit associated with the Nth headset.

16. The wireless communication system according to claim 15 wherein each individual text station further comprises an individual text station transceiver, an individual text station logic module, an individual text station display, an individual text station interface, and an individual text station near field communication circuit;

wherein the individual text station transceiver, the individual text station logic module, the individual text station display, the individual text station interface, and the individual text station near field communication circuit are electrically interconnected;

wherein the individual text station transceiver is an electrical device;

wherein the individual text station transceiver creates and maintains the wireless communications link selected from the plurality of wireless communication links between the plurality of text stations and each individual text station transceiver;

wherein the individual text station logic module is a programmable electrical device;

wherein the individual text station logic module receives a text-based message from the individual text station transceiver;

wherein the individual text station logic module converts the received electrical signals into a text-based message that is displayed on the individual text station display;

wherein the individual text station display is an electrical device used to display the text-based message transmitted from the individual text station logic module;

wherein the individual text station interface receives a text-based message from the user of the individual text station and transmits the text-based message to the individual text station logic module for transmission to the plurality of text stations by the individual text station transceiver;

wherein the individual text station near field communication circuit establishes the private communication facility.

17. The wireless communication system according to claim 16 wherein the plurality of text stations further comprises a first text station, a second text station, and an Nth text station;

wherein the first text station further comprises a first text station transceiver, a first text station logic module, a first text station display, a first text station interface, and a first text station near field communication circuit;

wherein the first text station transceiver, the first text station logic module, the first text station display, the first text station interface, and the first text station near field communication circuit are electrically interconnected;

wherein the first text station is a headset used to join the communication network formed by the wireless communication system;

wherein the first text station transceiver is the individual text station transceiver associated with the first text station;

wherein the first text station logic module is the individual text station logic module associated with the first text station;

wherein the first text station display is the individual text station display associated with the first text station;

wherein the first text station interface is the individual text station interface associated with the first text station;

wherein the first text station near field communication circuit is the individual text station near field communication circuit associated with the first text station;

wherein the second text station further comprises a second text station transceiver, a second text station logic module, a second text station display, a second text station interface, and a second near field communication circuit;

wherein the second text station transceiver, the second text station logic module, the second text station display, the second text station interface, and the second near field communication circuit are electrically interconnected;

wherein the second text station is a headset used to join the communication network formed by the wireless communication system;

wherein the second text station transceiver is the individual text station transceiver associated with the second text station;

wherein the second text station logic module is the individual text station logic module associated with the second text station;

wherein the second text station display is the individual text station display associated with the second text station;

wherein the second text station interface is the individual text station interface associated with the second text station wherein the second text station near field communication circuit is the individual text station near field communication circuit associated with the second text station;

wherein the Nth text station further comprises a Nth text station transceiver, a Nth text station logic module, a Nth text station display, a Nth text station interface, and a Nth near field communication circuit;

wherein the Nth text station transceiver, the Nth text station logic module, the Nth text station display, the Nth text station interface, and the Nth near field communication circuit are electrically interconnected;

wherein the Nth text station is a headset used to join the communication network formed by the wireless communication system;

wherein the Nth text station transceiver is the individual text station transceiver associated with the Nth text station;

wherein the Nth text station logic module is the individual text station logic module associated with the Nth text station;

wherein the Nth text station display is the individual text station display associated with the Nth text station;

wherein the Nth text station interface is the individual text station interface associated with the Nth text station;

wherein the Nth text station near field communication circuit is the individual text station near field communication circuit associated with the Nth text station.

* * * * *